United States Patent
Averseng

(10) Patent No.: US 8,285,426 B2
(45) Date of Patent: Oct. 9, 2012

(54) METHOD AND SYSTEM FOR LIMITING AN AIRCRAFT CONTROL SURFACE STEERING ANGLE

(75) Inventor: Didier Averseng, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 962 days.

(21) Appl. No.: 12/091,559

(22) PCT Filed: Oct. 19, 2006

(86) PCT No.: PCT/FR2006/051071
§ 371 (c)(1),
(2), (4) Date: Nov. 3, 2008

(87) PCT Pub. No.: WO2007/048960
PCT Pub. Date: May 3, 2007

(65) Prior Publication Data
US 2009/0222151 A1 Sep. 3, 2009

(30) Foreign Application Priority Data
Oct. 27, 2005 (FR) ...................................... 05 53267

(51) Int. Cl.
*G05D 1/08* (2006.01)
(52) U.S. Cl. ............................................. 701/3; 701/41
(58) Field of Classification Search .................. 701/3, 7, 701/8, 41; 244/75.17, 76 B, 76 C, 76 R, 244/87, 88, 184, 194, 195, 234, 235
See application file for complete search history.

(56) References Cited

U.S. PATENT DOCUMENTS

| | | | | | |
|---|---|---|---|---|---|
| 4,759,515 | A | * | 7/1988 | Carl | 244/76 R |
| 5,170,969 | A | * | 12/1992 | Lin | 244/194 |
| 5,791,596 | A | * | 8/1998 | Gautier et al. | 244/76 R |
| 6,526,338 | B2 | * | 2/2003 | Kubica et al. | 701/4 |
| 6,928,340 | B2 | * | 8/2005 | Van De Kreeke et al. | 701/4 |

FOREIGN PATENT DOCUMENTS

| | | |
|---|---|---|
| EP | 0488428 A2 | 6/1992 |
| EP | 1256863 A2 | 11/2002 |

OTHER PUBLICATIONS

Submission of American Airlines to NTSB, #DCA02MA001, regarding the accident involving AA Flight 587, dated Mar. 1, 2004 (pp. i to 63).*
NTSB Aircraft Accident Report, #NTSB/AAR-04/04, dated Oct. 26, 2004 (pp. i to 198).*

* cited by examiner

*Primary Examiner* — James Trammell
*Assistant Examiner* — David Testardi
(74) *Attorney, Agent, or Firm* — Perman & Green, LLP

(57) ABSTRACT

The disclosed embodiments concerns a process for limiting the control surface steering angle of an aircraft, including operations to:
  determine the maximum permissible steering angle in function of the speed of the aircraft,
  detect a yaw configuration of the aircraft following a first order for control surface deflection at a maximum steering angle and a first direction,
  apply a limit to the maximum permissible steering angle.
The disclosed embodiments also concern a system for implementing the process.

7 Claims, 4 Drawing Sheets

METHOD AND SYSTEM FOR LIMITING AN AIRCRAFT CONTROL SURFACE STEERING ANGLE

CROSS-REFERENCE TO RELATED APPLICATIONS

This application is the National Stage of International Application No. PCT/FR2006/051071, International Filing Date, 2006 Oct. 19, which designated the United States of America, and which international application was published under PCT Article 21(2) as WO Publication No. WO 2007/048960 and which claims the benefit of and priority from French Application No. 0553267, filed 2005-10-27, the disclosures of which are incorporated herein by reference in their entirety.

BACKGROUND

The disclosed embodiments concern a method for limiting the steering angle of an aircraft control surface under certain flight conditions, especially when the aircraft is caused to yaw and the steering control surface is operated at maximum clearance. The disclosed embodiments also concern a system for implementing said method.

The disclosed embodiments find application in the field of aeronautics and, in particular, in the field of an aircraft's control surface drive.

In an aircraft, the rudder is a mobile flap mounted on the tail fin of the aircraft and operated from the cockpit to change the direction of the aircraft. The tail fin constitutes a relatively important surface on the aircraft the essential role of which is to assure stability in the route of the aircraft. The tail fin is able to withstand forces which may be relatively significant. However, these forces must not surpass a certain level because this would involve breakage of the tail fin. These forces are dependent upon the flying conditions of the aircraft and, in particular, the speed of the aircraft. Also, to limit these forces on the tail fin, there is a system, which is installed on the majority of the airplanes, which makes it possible to limit control surface deflection under certain flying conditions, i.e. to limit the clearance allowed by the control surface. This limitation is obtained through stops located on both sides of the control surface and the position of which is controlled through struts. Limiting the angle of deflection of the steering angle of the control surface is directly connected to the speed of the aircraft. Thus, the faster the aircraft goes the more the clearance in the control surface is reduced; consequently the closer the stops are to the control surface. On the other hand, the slower the aircraft goes the higher the steering angle allowed; consequently more stops are farther away from the control surface. Under normal aircraft flight conditions, the rudder is used at landing, to align the aircraft with the landing strip, and when the aircraft is taxiing. In these two cases, the aircraft is at a low speed. The steering angle allowed by the control surface can thus be elevated.

Under abnormal aircraft flight conditions, for example, when there is engine failure, the rudder may be used to compensate for dissymmetry that occurs at the moment the motor loses output. In fact, when a motor ceases to function, the aircraft is thrown into yaw and flies askew, i.e., the aircraft is no longer in the flight line. It is then necessary to activate the rudder to bring the aircraft back into the flight line. Under these conditions, it is important that the clearance allowed by the control surface be sufficiently elevated to allow righting of the aircraft.

The traditional system for limiting the steering angle of the control surface is set up so that the pilot may compensate for the effects of such an engine failure. In other words, the traditional limitation is calculated so as to allow the pilot sufficient control to be able to compensate for dissymmetry generated by engine failure.

However, this traditional system does not take into account other abnormal situations which may require implementation of the control surface deflection.

In fact, nothing prevents the pilot from sending several successive commands for control surface deflection, in opposite directions, with angles reaching the allowed maximum clearance. For example, if the pilot first orders a control surface deflection in one direction, for one reason, then a second control surface deflection in the opposite direction, for another reason, then a third control surface deflection in the first direction, at the maximum steering angle, then the forces which affect the tail fin can become so significant that it will cause the structure of the aircraft to be shaken.

In another example of abnormal flight conditions, if an aircraft is thrown into yaw, following a control surface deflection order or when there is a motor failure, the aircraft will be flying askew. The wind will then be hitting it sideways. If, at that moment, the pilot orders a control surface deflection at the maximum angle, to regain the flight line, then the rudder will find itself traveling straight into the wind. Forces will begin to weigh heavily on the control surface. If the pilot orders a new control surface deflection, in the opposite direction, at a maximum angle, then the forces hitting the tail fin may exceed the force the aircraft was designed to bear.

The forces endured by the tail fin may then reach and even surpass the limits imposed by the construction of the aircraft itself. In the worst cases, the tail fin may break under the effect of these forces, or constraints, and could cause the aircraft to crash.

SUMMARY

The exact purpose of the disclosed embodiments is to remedy the drawbacks of the above explained techniques. To this end, the disclosed embodiments proposes a process and a system that increases security of an aircraft by preventing this type of maneuvers, i.e., a succession of control surface deflections, in opposite directions, at the maximum steering angle. In order to do this, the process and the system of the disclosed embodiments ensure a limitation on the permissible steering angle of the control surface, under certain flight conditions. In other words, the disclosed embodiments propose reducing the authority over the control surface drive offered to the pilot in order to limit the force under which the tail fin is subjected when the aircraft is yawing and the control surface deflection is implemented in the direction opposite to the maximum angle permitted.

More precisely, the disclosed embodiments concern a process for limiting the steering angles of an aircraft's control surface, including an operation to determine the maximum permissible steering angle in function of the speed of the aircraft, characterized in that it includes the following operations to:

detect a yaw configuration of the aircraft following a first order for control surface deflection at a maximum steering angle and a first direction, apply a limit to the maximum permissible steering angle.

This process may include one or more of the following characteristics:

detection of a yaw configuration of the aircraft consisting of detecting a control surface deflection with a maximum steering angle and a second direction, which is opposite to the first direction, detection of an aircraft yaw configuration consisting of detecting non-zero lateral acceleration of an aircraft.

The disclosed embodiments also concern a system for implementing said method. This system is a system for limiting the control surface steering angle of an aircraft, including:

a device for acquiring the speed of the aircraft,
a device for determining the maximum permissible steering angle in function of the speed of the aircraft,
a device for acquiring the current position of the control surface,
characterized in that it includes:
a device to detect a yaw configuration of the aircraft and order for control surface deflection at a maximum permissible steering angle and a first direction, and
a device to limit the value of the maximum permissible steering angle.

This system may include one or more of the following characteristics:

the device to detect yawing is a logical circuit which verifies that two successive control surface deflections, called a doublet, are in the opposite direction and at the maximum permissible steering angles.

the device to detect yawing includes a lateral acceleration sensor.

the device to detect yawing includes a logical circuit to verify the existence of an order for control surface deflection at a maximum permissible steering angle, when non-zero lateral acceleration has been detected.

the logical circuit includes two means of detection linked to an AND gate.

each means of detection includes an AND gate, a delay and a filp-flop.

limitation of the maximum permissible steering angle is obtained by changing the length of the strut forming a stop for the control surface.

DETAILED DESCRIPTION

Figure 1:
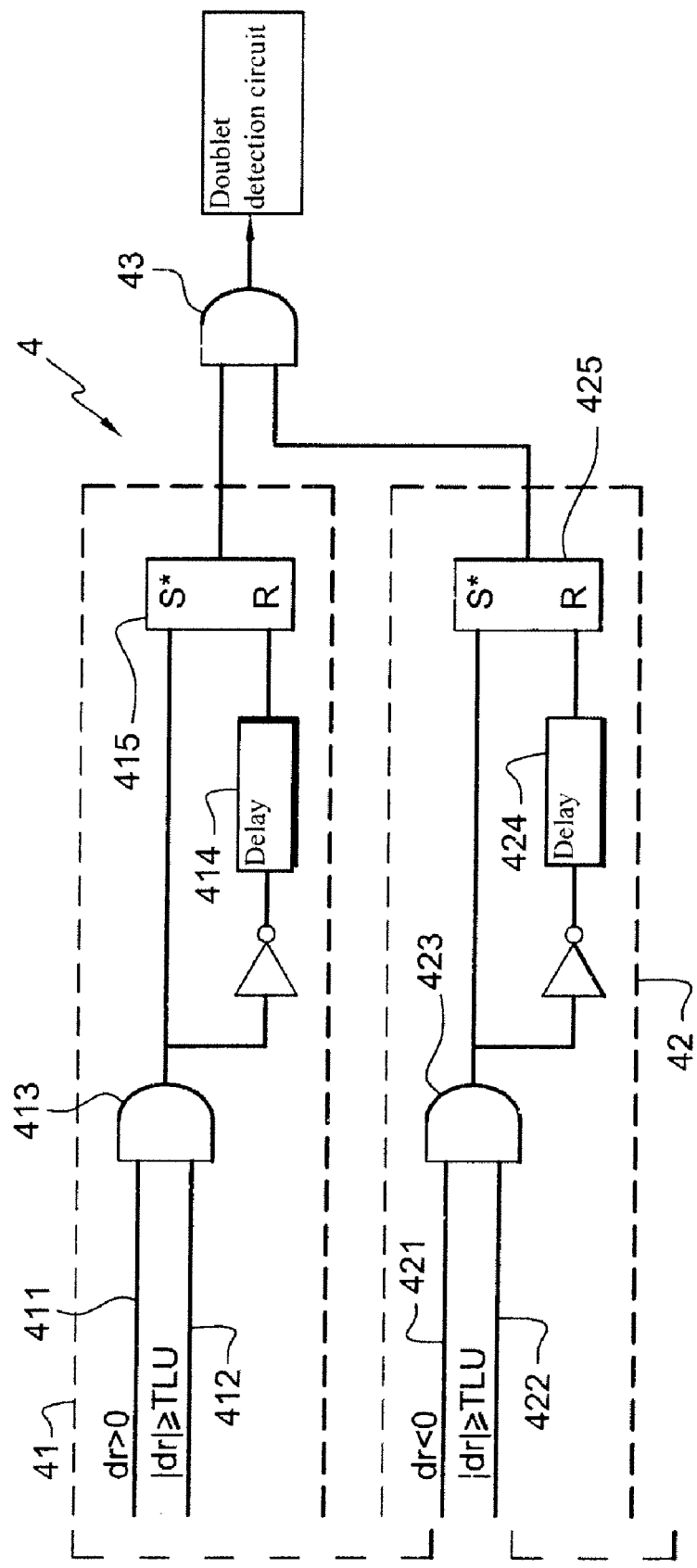
FIG. 1 shows a logical circuit for detection of a doublet which makes detection of a critical configuration possible.

The disclosed embodiments concern a process and a system that makes it possible to quickly reduce the permissible steering angle, when an aircraft is in a yaw configuration and that steering having a maximum angle is ordered in the opposite direction of the current position of the control surface, i.e., in the position in which the control surface is found during the yaw. This configuration shall subsequently be called critical configuration.

The permissible steering angle corresponds to the maximum clearance to which the control surface may undergo, in response to a steering command. This angle is defined by two stops situated on either side of the control surface. The position of these stops is imposed by a device called RTLU (Rudder Travel Limitation Unit, in English).

Consequently, the disclosed embodiments need to be able to detect the critical configuration by detecting the yaw of the aircraft, the maximum value of the RTLU, i.e., the value of the maximum permissible steering angle and the value of the current steering angle corresponding to the current position of the control surface. At the present time, aircraft yaw information is not available on the majority of aircraft.

Also, in order to determine the existence of yaw, the disclosed embodiments propose detecting:

the application of two successive steering orders at maximum clearance in a direction and then in the other direction, the existence of lateral acceleration of the aircraft.

These two detection modes make it possible to deduce that the aircraft is yawing.

More specifically, the process of the disclosed embodiments consist in detecting that the aircraft is yawing, with one of the modes described above, and that the control surface has attained maximum clearance and has changed direction. As soon as these two facts have been detected, the process of the disclosed embodiments determines, by default, that the aircraft is in a critical configuration and that there is a risk of possibly exceeding the workload limits. The process of the disclosed embodiments consists in reducing the maximum permissible clearance of the control surface in order to ensure that the forces on the control surface do not exceed the workload limit for which the aircraft was designed. In this way, the authority of the pilot over the control surface is reduced and the safety of the aircraft is increased.

The process that will be described is implemented by the disclosed embodiments's system. This system includes:

a device (3) for acquiring the speed of the aircraft,
a device (1) for determining the maximum permissible steering angle in function of the speed of the aircraft,
a device (2) for acquiring the current position of the control surface, It also comprises an electronic circuit to detect a critical configuration and to determine the value that limits the clearance of the control surface, as well as communication buses that ensure the link between the aircraft's various computers and the detection circuit to furnish, to that circuit, the data, provided by the computers, necessary to detect the critical configuration.

Figure 2:
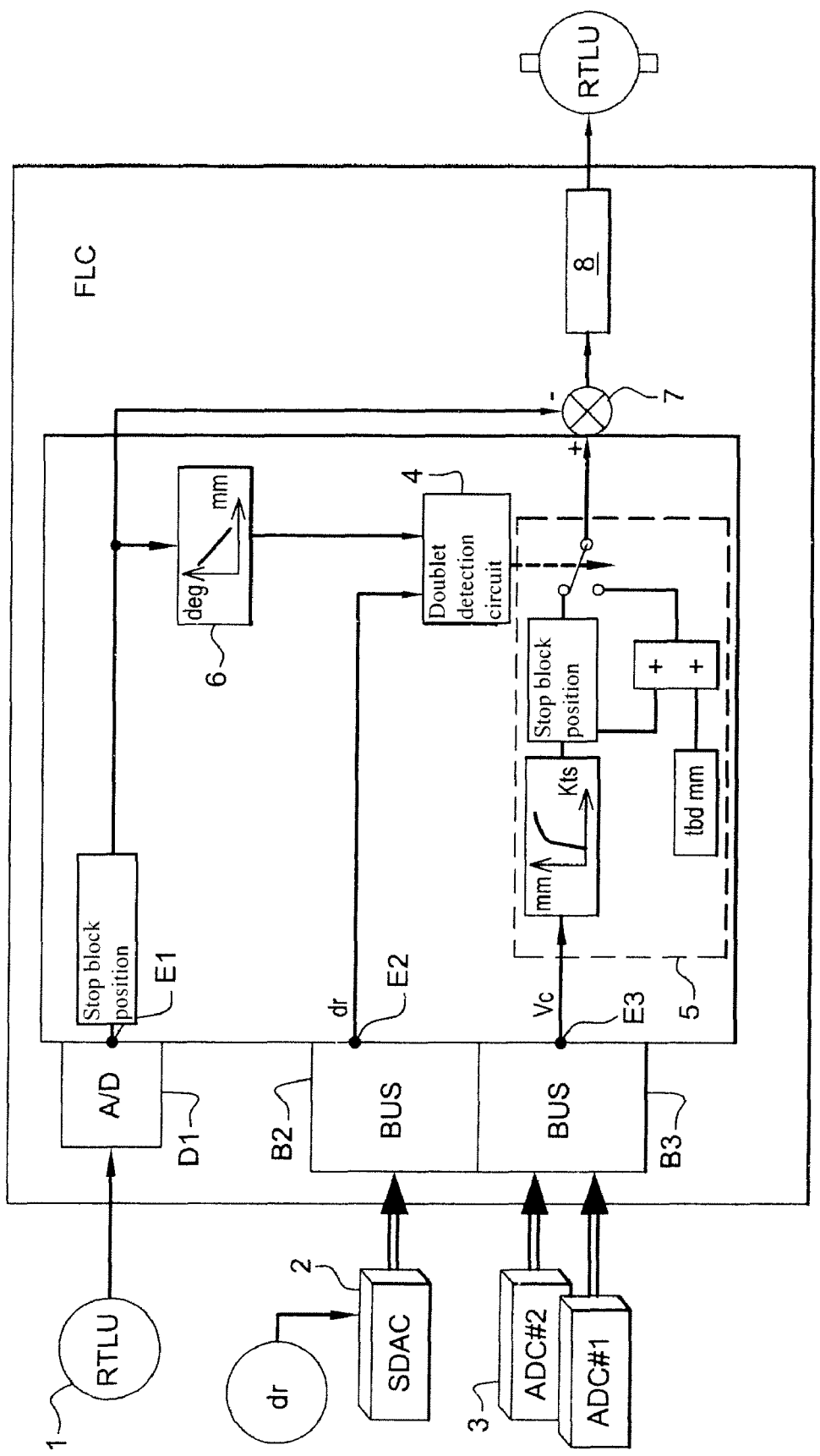
FIG. 2 shows a functional diagram of the limiting system for the steering angle of the control surface, according to a first embodiment of the disclosed embodiments.

In FIG. 2, an example of the disclosed embodiments's system is shown with an electronic circuit which allows the detection of a critical configuration and the steering angle limit of the control surface. This circuit implements the first mode of the embodiment of the disclosed embodiments in which the yaw of the aircraft is determined by applying two successive steering orders with a maximum clearance, in one direction and then in another. One of these directions is called the first direction; the other is called the second direction. The circuit in FIG. 2 makes it possible to detect two successive steering orders, in opposite directions, up to the stop. In order to accomplish this, this circuit receives, with one entry (E1), the position of the control surface stop, i.e., the value of the maximum permissible steering angle for the speed of aircraft's flight. This value is supplied by the RTLU Unit (1), for example in analog form. It is then converted into digital data by a demodulator (D1) before entering it into the disclosed embodiments's circuit. The circuit receives, through an entry (E2), the dr value of the current position of the control surface, i.e., the value of the angle between the actual position of the control surface and the inactive position of the aforesaid the control surface. Actual position in which the control surface is found at the moment of calculation, in other words, the steering angle of the control surface. This value is supplied, through an ARINC 429 type communication bus (B2), by a computer (2) handling the position of the control surface, for example, a SDAC (System Data Acquisition Concentrator) system data acquisition concentrator. The circuit receives, through its entry (E3), information on the aircraft's speed. This information is supplied through a bus (B3), through computers (3) handling the aircraft's speed, for example an ADC (Air Data Computer) computer or ADIRU.

This circuit ensures a comparison between the RTLU value and the dr value of the current position of the control surface. These two values are expressed in degrees. This comparison is carried out by the doublet detection circuit (4), shown in the detail in FIG. 1.

More specifically, FIG. 1 shows an example of the logical circuit ensuring the detection of a doublet, i.e., detection of two successive control surface deflection orders at maximum clearance and in two opposite directions. This doublet detection circuit (4) comprises a first means of detection (41) and a second means of detection (42). These two means of detection (41 and 42) are connected to a logical AND gate (43).

The first means (41) includes an AND gate (413) that takes value (1) when the dr deflection direction of the control surface is positive (entry 411 from circuit 4) and the absolute dr deflection value is greater than or equal to the RTLU value (entry 412 from circuit 4). This means (41) includes a delay (414) that applies a certain delay in the logical value obtained by output from the AND gate 413. This delay corresponds to at least the recorded time between the steering order to the control surface and the reaction of the control surface, i.e., a change in the position of the control surface. This delay is on the order of 5 or 6 seconds. Means (41) also includes a flip-flop (415) that receives, the logical value direction from the AND gate and, the logical value coming from the delay (414). This flip-flop (415) locks the logical value (1) or (0) received from the AND gate (413). Means (41) preserves the logical value obtained by the output from the first AND gate (413) for a time of 5 to 6 seconds to ensure that the control surface has time to react to the steering order.

Means (41) thus detects the existence of deflection at a maximum angle in the first direction.

The second means (42) of the doublet detection circuit (4) includes the AND gate (423) that takes value (1) when the dr deflection direction of the control surface is negative (entry 421 from circuit 4) and the absolute dr deflection value is greater than or equal to the RTLU value (entry 422 from circuit 4). This second means 42 includes a delay 424 which applies the same delay to the logical value obtained at the output of AND gate 423 as the delay 414. Means 42 comprises a flip-flop 425 to lock the logic value 1 or 0 received from the AND gate 423. Means 42 retains the logical value obtained at the output of the first AND gate 423 for a time of 5 to 6 seconds to ensure that the control surface has had time to react to the turn command.

Means 42 thus detects the existence of a deflection at a maximum angle in a second direction.

Each of the means (41 and 42) are connected in output to the logical AND gate (43). When the AND gate (43) receives a logical value (1) on each of its inputs, this means that two deflection orders in opposite directions and at maximum angles have been detected. A logical value (1) is emitted though the output of the doublet detection circuit (4). In the opposite case, a logical value (0) is emitted though the output of circuit (4).

When output from the AND gate (43) is at 1, this means that a critical configuration has been detected. The circuit in FIG. 2 ensures a restriction of the RTLU value. A command circuit for the stop (5) associated with an adder (7) and a power loop (8) ensures that the RTLU value is limited, i.e., the limited permissible steering angle.

FIG. 2 is described taking into account that the RTLU value is an angular value supplied directly by the RTLU unit (1). However, it should be noted that the control surface stop is performed out by means of a strut, of mechanical type. Consequently, the information supplied by the RTLU Unit (1) is a metric value, for example expressed in millimeters. Consequently, the circuit in FIG. 2 includes elements for conversion of metric values into angular values, specifically an element (6) for converting millimeters into degrees. Thus, the limit on the permissible steering angle corresponds to the extension in millimeters of the strut: The longer the strut becomes, the greater the limitation placed on the permissible steering angle.

Figure 3:
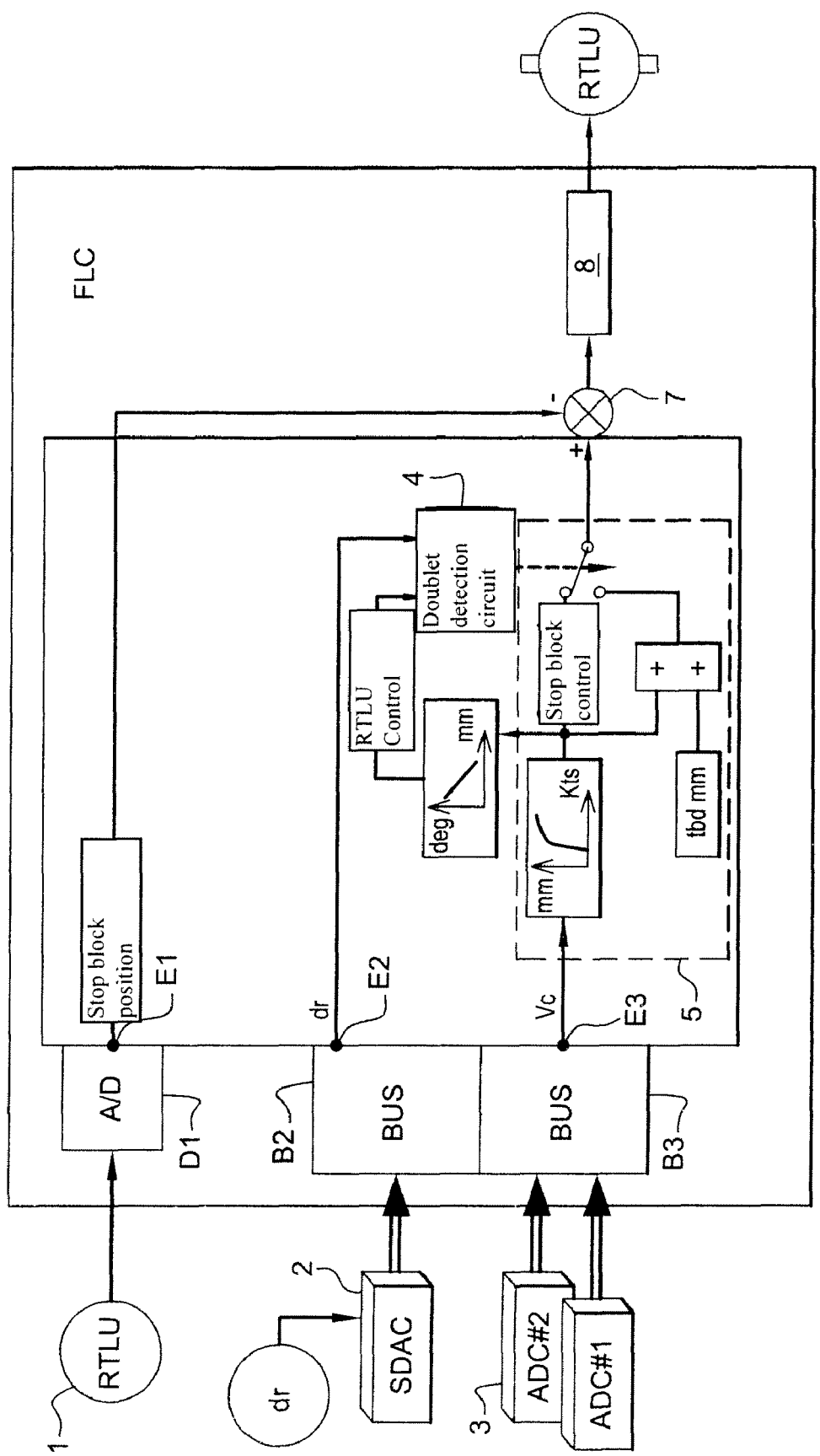
FIG. 3 shows a variation of the disclosed embodiments's system.

In the example of FIG. 3, the critical configuration is detected by comparing the steering angles of the control surface. In FIG. 3, an example of the circuit is shown which makes it possible to detect a critical configuration by comparing the current position of the control surface and the RTLU position order. In other words, with this circuit, you do not have to wait until the RTLU is in place. The RTLU command is directly used. The double detection circuit (4) consequently received input of the dr value of the control surface position and the value of the RTLU command supplied by the stop command circuit (5).

In a second embodiment of the disclosed embodiments, it is considered that the aircraft is yawing from the moment its lateral acceleration is a non-zero value. In fact, on the majority of aircraft, speed sensors are found on the sides of the aircraft. These sensors make it possible to detect the lateral acceleration value of the aircraft. If this lateral acceleration is non-zero, yawing exists. And if yawing is detecting and a control surface command with maximum clearance is also detected, then the aircraft is in a critical configuration. An example of a circuit for implementing this embodiment is shown in FIG. 4.

Figure 4:
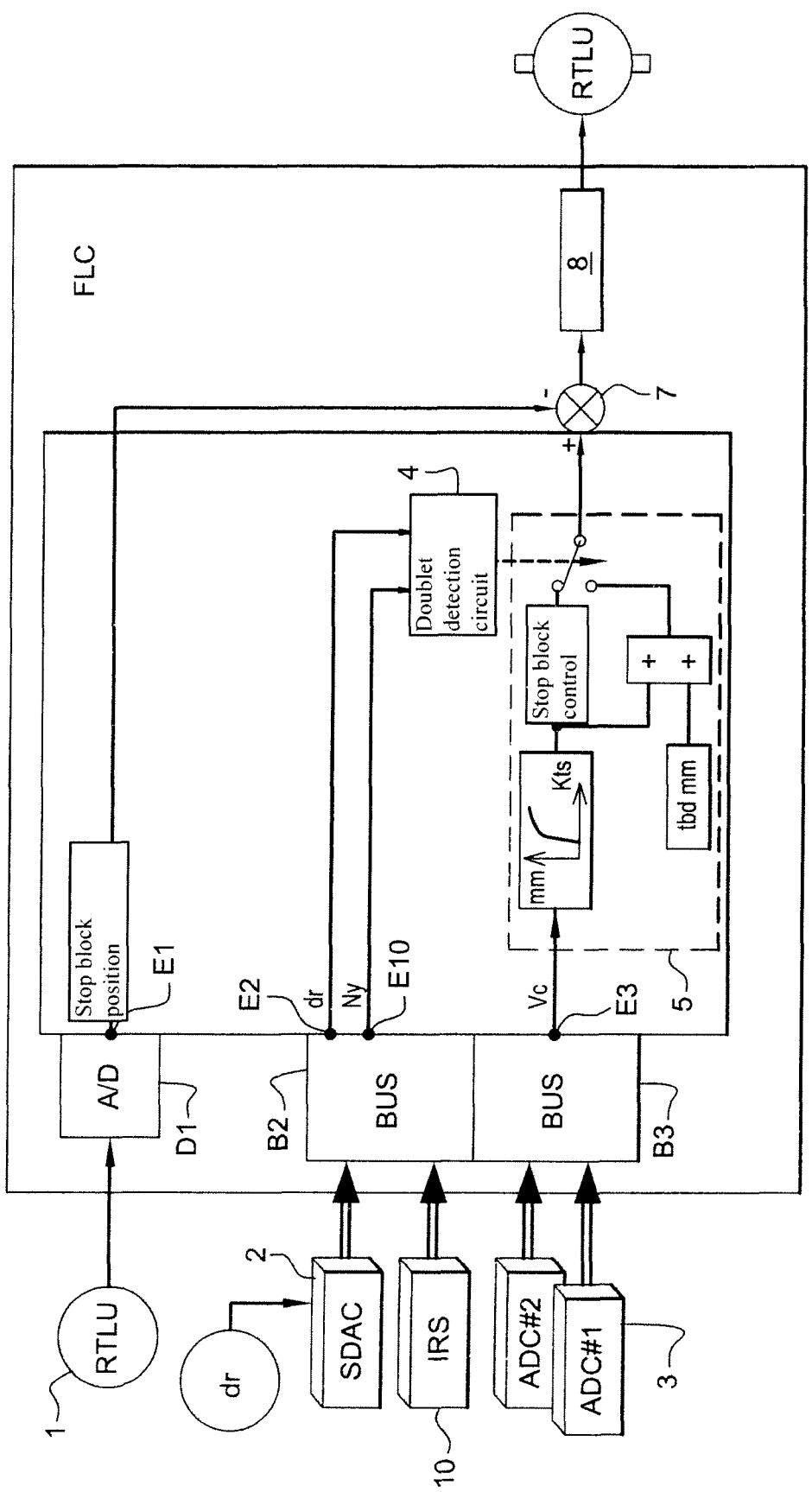
FIG. 4 shows a second embodiment of the disclosed embodiments's system.

This circuit in FIG. 4 is identical to that of FIG. 2, except as concerns certain data received by input from the circuit and the doublet detection circuit. More specifically, in this embodiment, the circuit includes an entry (E10) receiving value Ny of the lateral acceleration of the aircraft. This Ny value is supplied by a computer (10) through the bus (B2).

In this embodiment, the doublet detection circuit (4) includes a first means to verify if Ny is non-zero and if the control surface is in a first direction and a second means that verifies the existence of a control surface deflection in the second direction with maximum clearance. If the logical values from these two means are at 1, then it is deemed that the aircraft is in a critical configuration.

Whatever the embodiment, the system of the disclosed embodiments may be setup in an aircraft flight command computer, for example the FLC computer (Field Limitation Computer). This FLC computer has the advantage of ensuring the determination of the RTLU command; consequently of necessity, it identifies the RTLU value.

The invention claimed is:
1. Process for limiting the steering angles of an aircraft's control surface, the process comprising:
using a first device to acquire a speed of the aircraft;
using a second device to determine a maximum permissible steering angle as a function of the speed of the aircraft;
supplying a current position of the control surface from a third device;

using an electronic circuit to detect a yaw configuration of the aircraft and an order for control surface deflection at the maximum permissible steering angle by using a logical circuit to verify that two successive control surface deflections are in opposite directions and at the maximum permissible steering angle; and using a computer to apply a limit to the maximum permissible steering angle.

2. Process according to claim 1, wherein detection of the aircraft yaw configuration comprises detecting non-zero lateral acceleration of the aircraft.

3. System for limiting the steering angle of a control surface of an aircraft, including:
- a device for acquiring the speed of the aircraft,
- a device for determining the maximum permissible steering angle as a function of the speed of the aircraft,
- a device for acquiring the current position of the control surface, wherein the system includes:
- a device to detect a yaw configuration of the aircraft and an order for control surface deflection at a maximum permissible steering angle, said device to detect the yaw configuration comprising a logical circuit which verifies that two successive control surface deflections are in opposite directions and at the maximum permissible steering angle; and
- a device to limit the value of the maximum permissible steering angle.

4. System according to claim 3, wherein the device to detect a yaw configuration includes a lateral acceleration sensor.

5. System according to claim 3, wherein the logical circuit comprises two means of detection connected by an AND gate.

6. System according to claim 3, wherein the limitation of the maximum permissible steering angle is obtained by changing the length of a strut forming a stop for the control surface.

7. An aircraft, comprising a limiting system for the steering angle of the control surface, according to claim 3.

\* \* \* \* \*